United States Patent [19]

Takahashi

[11] Patent Number: 4,858,459

[45] Date of Patent: Aug. 22, 1989

[54] INERTIA FORCE BALANCING APPARATUS

[75] Inventor: Muneharu Takahashi, Niihama, Japan

[73] Assignee: Sumitomo Heavy Industries, Ltd., Tokyo, Japan

[21] Appl. No.: 78,937

[22] Filed: Jul. 29, 1987

[30] Foreign Application Priority Data

Apr. 10, 1986 [JP] Japan ................................ 61-81077

[51] Int. Cl.$^4$ ........................................... B21B 21/00
[52] U.S. Cl. ........................................ 72/214; 72/249; 188/380; 267/75; 267/89; 267/137; 267/175
[58] Field of Search ................ 72/208, 214, 209, 249; 188/379, 380; 267/89, 91, 75, 175, 137

[56] References Cited

U.S. PATENT DOCUMENTS

| 3,337,209 | 8/1967 | Kozhevnikov et al. | 267/75 |
| 3,536,165 | 10/1970 | Desjardins | 188/380 |
| 4,360,087 | 11/1982 | Curwen | 188/379 |

FOREIGN PATENT DOCUMENTS 1427910 1/1973 Fed. Rep. of Germany ........ 72/214
43472 11/1976 Japan.

Primary Examiner—Lowell A. Larson
Assistant Examiner—Steven B. Katz
Attorney, Agent, or Firm—Armstrong, Nikaido, Marmelstein, Kubovcik & Murray

[57] ABSTRACT

An inertia force balancing apparatus for a machine haivng a reciprocating heavy object, such as a Pilger rolling mill provided with a heavy object stand having a pair of Pilger mill rolls and horizontally supported such as to be reciprocable and with a drive device for imparting reciprocating motion to the Pilger mill stand by a motive power converted from rotational motion, into reciprocating motion. A spring device secured at its end to the heavy object and adapted to balance the inertial force of the reciprocating motion of the heavy object. A control device is provided for changing the spring force of the spring device in accordance with the rotational speed of the rotational motion of the drive device.

3 Claims, 6 Drawing Sheets

INERTIA FORCE BALANCING APPARATUS

BACKGROUND OF THE INVENTION

1. Field of the Invention

The present invention relates to an inertia force balancing apparatus for a machine provided with a reciprocating heavy object, such as a Pilger rolling mill for producing seamless steel pipes and the like.

2. Description of the Prior Art

Generally, in a Pilger rolling mill in which Pilger mill rolls are installed, as shown in Japanese Pat. Publication No. 43472/76, a material pipe is rolled between a pair of Pilger mill rolls having special caliper compasses and a mandrel rod so as to produce seamless steel pipes. To give a description of its arrangement and operation with reference to a schematic diagram of a conventional example as shown in FIG. 2, a crankarm 3 and a fan-shaped balancer 4 are secured to a crankshaft 2 which is rotated by a main motor. A control rod 5 and a connecting rod 6 for a V-balancer are respectively connected to the crankarm 3. A Pilger mill stand 8 in which a pair of Pilger mill rolls are mounted is connected to the distal end of the connecting rod 5, and a V-balancer 9 is suspended from the distal end of the connecting rod 6.

When the crankshaft 2 is rotated by the main motor at a fixed rotational speed $\omega$, the Pilger mill stand 8 reciprocates via the crankarm 3 and the connecting rod 5. In conjunction with the reciprocal motion thereof, the Pilger mill rolls 7 are rotated by means of a rack and pinion (neither are shown) to roll a pipe being worked. More specifically, when the Pilger mill rolls 7 rotate and the pipe with the mandrel rod inserted therethrough advances, the rolls 7 bite into the pipe, and when the rolls 7 further rotate, the pipe is rolled down to a finishing dimension. Subsequently, the pipe is released from the rolls 7. Although the pipe remains stationary while being rolled by the rolls 7, the pipe advances simultaneously as it is freed from the rolls 7.

With the Pilger rolling mill having the above-described arrangement, a crank mechanism is adopted to reciprocate the Pilger mill stand 8 with the Pilger mill rolls 7 mounted therein. Hence, imbalance is created as a result of the inertia force of the reciprocal motion which is induced by the cranking motion, as well as a couple caused by the inertia force. Accordingly, in order to eliminate this imbalance, the fan-shaped balancer 4 and the V-balancer 9 are installed, as described above.

With the conventional Pilger rolling mill, however, the following drawbacks occur owing to the installation of the fan-shaped balancer 4 and the V-balancer 9: (1) The overall apparatus becomes large in size due to the installation of the fan-shaped balancer 4 and the V-balancer 9. (2) With the fan-shaped balancer 4 and the V-balancer 9, although it is possible to eliminate the imbalance of a term of first degree (this refers to a term of first degree in a known general formula expressing a inertia force of reciprocal motion; hereafter the same) based on the rotational speed $\omega$ of the crankshaft 2, the imbalance of the term of higher degree cannot be eliminated. If an attempt is made to reduce the imbalance of the term of higher degree, the ratio of the length R of the crankarm 3 to the length L of the connecting rod 5 must be decreased, and this results in the length L of the connecting rod 5 increasing, the overall apparatus hence becoming large in size. (3) Since the imbalance of the term of higher degree based on the rotational speed $\omega$ of the crankshaft 2 cannot be eliminated, a large inertia force proportional to the raising of $\omega$ to second power is received by the connecting rod 5, the crankshaft 2 and the like. Therefore, if the speed is increased, provision of a structure which is capable of withstanding this inertia force becomes unrealistic, and there are, hence, limitations to the amount by which the speed can be increased. (4) Due to the provision of the V-balancer 9, a Pilger rolling mill employed for rolling, for instance, a material steel pipe with a 260 mm diameter requires about 8 m-deep foundation work. In the final analysis, it would be difficult to provide adequate maintenance for the V-balancer 9.

On the other hand, in a Pilger rolling mill in which a Pilger mill stand with a pair of Pilger mill rolls is mounted, a method of balancing an inertia force is known wherein a piston rod of an air cylinder is connected to the Pilger mill stand, and compressed air is supplied to the air cylinder, thereby balancing the inertia force of the reciprocating Pilger mill stand (see the specification of U.K. Pat. No. 1355733).

However, with such a known method of balancing the inertia force, there have naturally been problems in that, since the inertia force is balanced by compressed air whose volume can be diminished, the compressor and the air cylinder for the compressed air become large in size, and that, even if an attempt is made to back up the force of the Pilger mill roll to roll a pipe by means of the compressed air, the compressed air is unable to provide a powerful force. Moreover, if an attempt is made to balance the inertia force of the reciprocal motion by driving the air cylinder by compressed air, excessively large energy is required as a driving force for this purpose.

SUMMARY OF THE INVENTION

Accordingly, an object of the present invention is to provide an inertia force balancing apparatus for a machine having a reciprocating heavy object which is capable of keeping to a minimum the amount of energy required as an external force for balancing and which is capable of minimizing the stroke for adjustment of the position of the other end of a spring assembly employed for balancing.

To this end, according to the present invention, there is provided an inertia force balancing apparatus for a machine provided with a heavy object horizontally supported such as to be reciprocable and with a drive device for imparting reciprocating motion to the heavy object by means of a motive power converted from rotational motion into reciprocating motion, the apparatus comprising: spring means secured at its one end to the heavy object and adapted to balance the inertia force of the reciprocating motion of the heavy object; and a control device for changing the spring force of the spring means in accordance with the rotational speed of the rotational motion of the drive device.

DESCRIPTION OF THE PREFERRED EMBODIMENT

Figure 1:
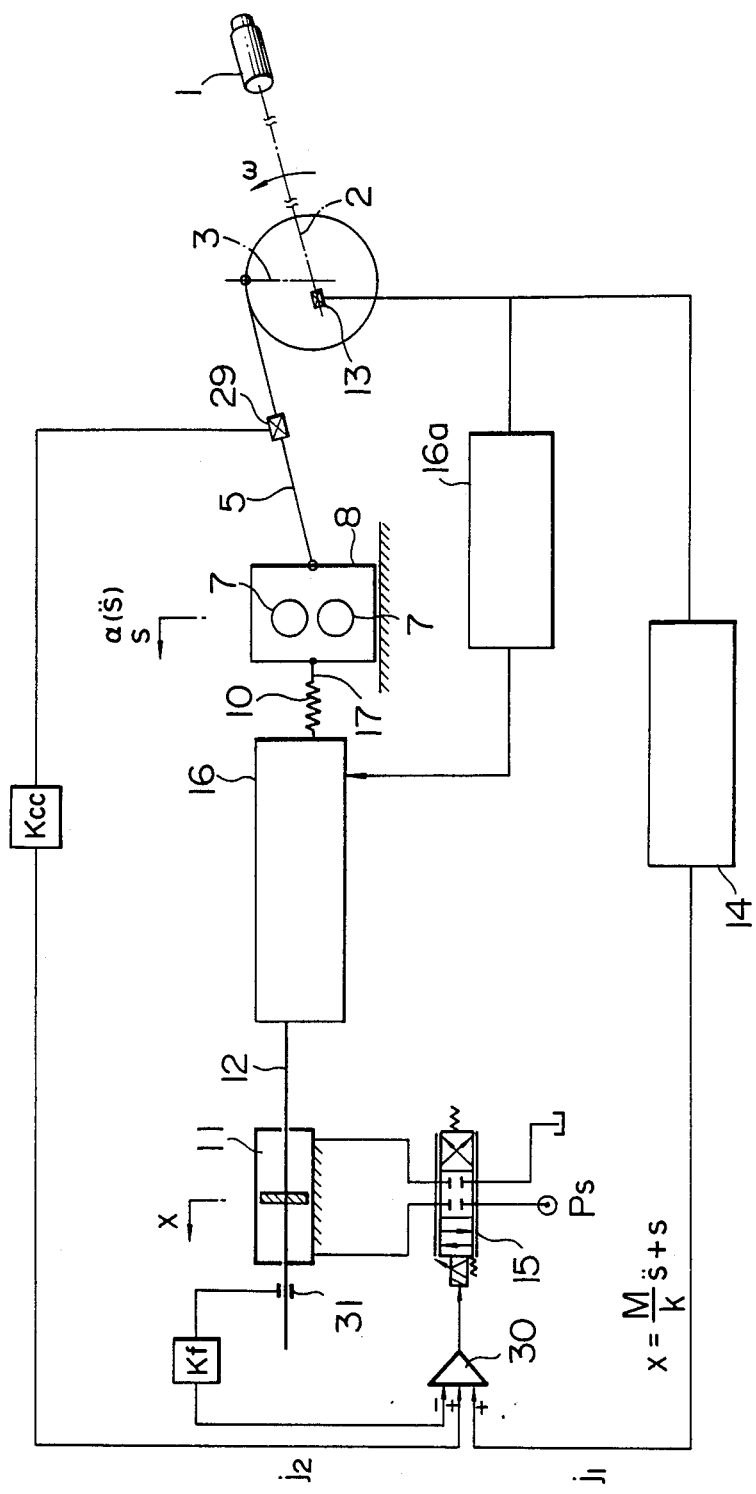
FIG. 1 is a schematic diagram of an inertia force balancing apparatus in accordance with the present invention.
Figure 2:
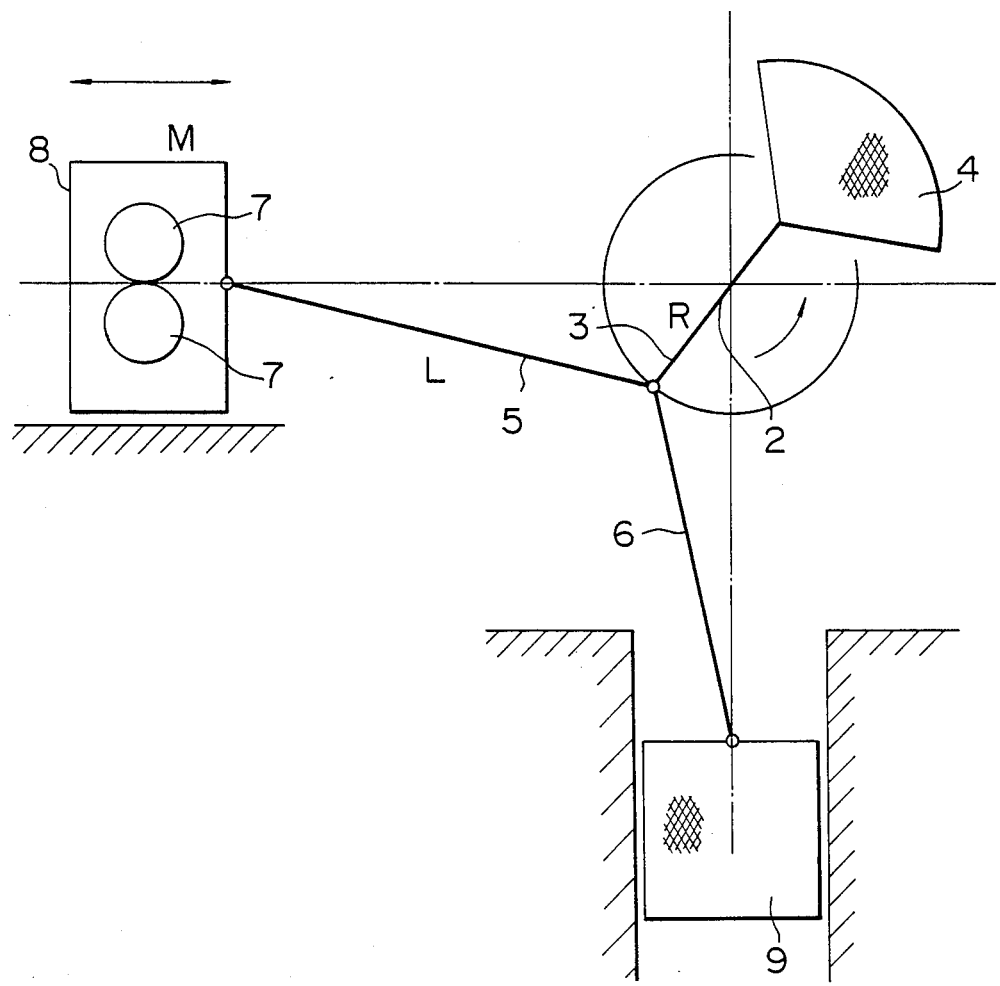
FIG. 2 is a schematic diagram of a conventional example of an inertia force balancing apparatus.

Referring now to FIG. 1, detailed description will be given of an arrangement in accordance with an embodiment of the present invention. Portions that are identical with those of the conventional example as shown in FIG. 2 are denoted by the same reference numerals, and description thereof will be omitted.

Basic Control

This embodiment may be suitably used for a so-called large-type Pilger rolling mill which rolls 260 mm-diameter seamless steel pipes and in which an inertia force of reciprocal motion of approximately 60 tons is generated. In outline, this embodiment is arranged such that the inertia force generated as a result of the reciprocal motion of the Pilger mill stand 8 is balanced by means of a coil spring assembly 10 mounted in the Pilger mill stand 8.

By noting the fact that the term of first degree of the inertia force of the Pilger mill stand 8 substantially agrees with the linear characteristics of the springs, if it is assumed that M: weight of the Pilger mill stand 8

α: acceleration of a displacement s from the central position of the Pilger mill stand 8, and x: displacement of the hydraulic cylinder 11, then following formula holds:

$$M \times \alpha = k(s-x) \quad (1)$$

Incidentally, the approximate magnitude of a spring constant k used here is determined as follows: If it is assumed for the sake of simplicity that R/L << 1, $$\alpha = \omega^2 \times s \quad (2)$$

is derived from the term of first degree of the inertia force of the reciprocal motion resulting from the cranking motion.

Accordingly, from Formulae (1) and (2), we have $$x/s \approx 1 - (M\omega^2/k) \quad (3)$$

Using this Formula (3), the spring constant k may be selected in such a manner that the displacement x of the hydraulic cylinder becomes 0, i.e., such that the hydraulic cylinder 11 will not move to any substantial extent. In other words, the spring constant k may be selected in such a manner that, at the time of the maximum rotational speed ω (when the term of first degree of the inertia force is a maximum value), $$x/s = 0$$

will hold in Formula (3)

Accordingly, the spring constant k is determined by $$k = M\omega^2{}_{max} \quad (4)$$

In other words, if the coil spring assembly 10 having the spring constant k determined by this Formula (4); is mounted, it is possible to eliminate most of the imbalance with the assistance of the coil spring assembly 10, and the position of the other installing end of the coil spring assembly 10 will in practical terms not move at all.

In actuality, however, the formula R/L << 1.0 is not feasible, since the term of higher degree in a known general formula cannot be ignored. In this embodiment, therefore, the other end of the coil spring assembly 10 is installed in the piston rod 12 of the hydraulic cylinder 11, and the position of the other end of the coil spring assembly 10 is controlled, whereby the spring force of the coil spring assembly 10 is made variable, and the term of higher degree of the inertia force is also balanced.

A displacement instructing value X is found with respect to the displacement x of the hydraulic cylinder. In other words, it is found from the following formula obtained by modifying Formula (1):

$$X = (M/k)s = s \quad (5)$$

This displacement instructing value X is computed by supplying to a computing section 14 the rotational speed ω detected by a tacho-generator and a rotational angle detector 13 both provided on the crankshaft 2. That value is converted to a corresponding voltage, and is, as a voltage instructing value j1, supplied to a servo valve 15 for supplying hydraulic pressure to the hydraulic cylinder 11. The hydraulic cylinder 11 is reciprocated by thus controlling the servo valve 15, so as to control the position of the other end of the coil spring assembly 10. Accordingly, in this embodiment, the term of higher degree of the inertia force of the reciprocating Pilger mill stand 8 can also be balanced.

In this embodiment, the rotational speed ω of the crankshaft 2 can be used by varying it, as necessary. For that reason, as is also evident from the foregoing Formula (1), a spring constant varying device 16 is provided for varying the spring constant k to an optimum value according to the changed rotational speed ω. In other words, in FIG. 1, in order to change the spring constant k, such a spring constant k that will satisfy Formula (1) in correspondence with the rotational speed ω detected by the tacho-generator and the rotational angle detector 13 (both installed on the crankshaft 2) is computed by a spring constant computing section 16a. In addition, the number of effective springs of the coil spring assembly 10 is varied in order to obtain the computed spring constant k.

Figure 5:
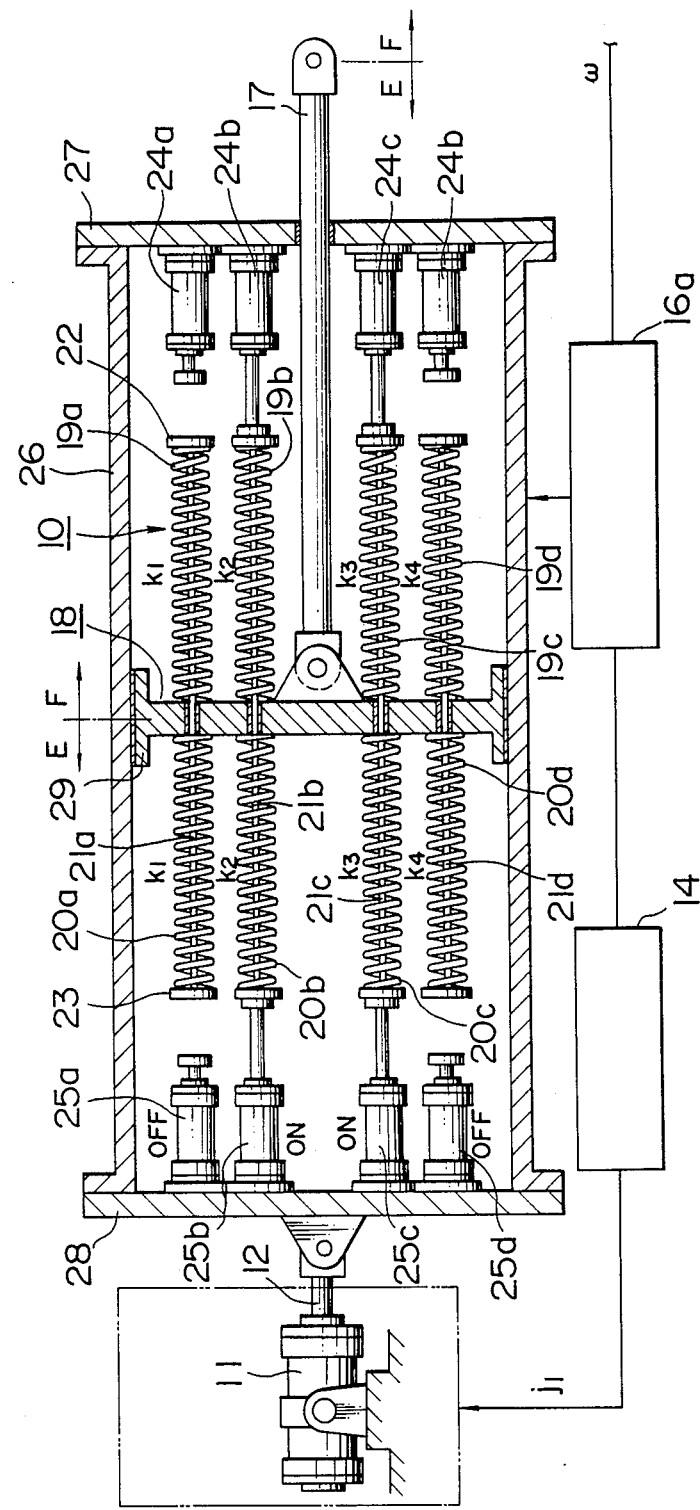
FIG. 5 is a detailed diagram of a spring constant varying device.

The details of the spring constant varying device 16 are shown in FIG. 5. In the drawing, a connecting rod 17 connected to the Pilger mill stand 8 is connected to a guide 18, and the coil spring assembly 10 is mounted on the guide 18. The coil spring assembly 10 comprises four first compression coil springs 19a, 19b, . . . having spring constants k1, k2, . . . on one side and four second compression coil springs 20a, 20b, . . . on the other side. Four spring rods 21a, 21b, . . . are slidably inserted through the guide 18, and first and second spring bearings 22, 23 are secured to the opposite ends of each of the spring rods 21. Accordingly, each of the first compression coil springs 19 is received by the guide 18 and the first spring bearing 22. These first and second spring bearings 22, 23 are adapted to be pressed by first and second hydraulic cylinders 24a, 24b, . . . , 25a, 25b, . . . for controlling the spring action. Each of the first hydraulic cylinders 24 is secured to one end plate 27 of a guide frame 26, while each of the second hydraulic cylinders 25 is secured to the other end plate 28. A liner 29 of the guide 18 is slidably guided by the guide frame 26. The connecting rod 17 is slidably inserted through one end plate 27, while the piston rod 12 of the hydraulic cylinder 11 is connected to the other end plate 28.

The alteration of the coil spring constant k of the coil spring assembly 10 is effected as follows: The position shown in FIG. 5 is assumed to be the neutral position, and, as shown in the drawing, hydraulic pressure is supplied to the first hydraulic cylinders 24b, 24c, and the second hydraulic cylinders 25b, 25c. When the Pilger mill stand 8 then moves in the direction of the arrow E, the guide 18 also slides in the same direction by means of the connecting rod 17. Hence, the second compression coil springs 20b, 20c are compressed. Next, when the Pilger mill stand 8 returns in the direction of the arrow F in the drawing, the guide 18 also slides in the same direction, so that the first compression coil springs 19b, 19c are compressed. Accordingly, the total spring constant of the compression coil springs 19, 20 becomes k2 +k3. In addition, if hydraulic pressure is supplied to all of the first and second hydraulic cylinders 24, 25, all the first and second compression coil springs 19, 20 undergo spring action, and the spring constant becomes k1+k2+k3+k4. In this case, the spring constant is balanced with the maximum value of the inertia force of the reciprocating motion of the Pilger mill stand 8.

Because it is necessary to select an optimum spring constant k in correspondence with the rotational speed $\omega$, control is effected in such a manner that each of the hydraulic cylinders 24a, 24b, ..., 25a, 25b, ... is turned ON and OFF by means of signals obtained by computation in the spring constant computing section 16a, and spring constants are combined so as to obtain an optimum spring constant.

Improvement of Balancing Accuracy

Furthermore, in this embodiment, a compensation signal j2 in which, for instance, the sliding frictional force of the Pilger mill stand 8 and an error between measured values and the actual values are taken into consideration is supplied to the servo valve 15. In other words, in order to improve the balancing accuracy, a tension detector 29 is mounted on the connecting rod 5, and the signal j2 from the tension detector 29 is fed back as a feedback gain Kcc to an amplifier 30 which gives the displacement instructing value X.

Incidentally, with respect to the actual operation of the hydraulic cylinder 11, the movement of the hydraulic cylinder 11 is detected by a position sensor 31 provided on the other end of the piston rod 12, and a signal thus obtained is fed back as a feedback gain Kf to the amplifier 30, and positional control is effected in such a manner that the hydraulic cylinder 11 will move in accordance with the displacement instructing value X of the hydraulic cylinder 11.

Assisting in Rolling Operation

In addition, since the hydraulic cylinder 11 is used in this embodiment, a horizontal force required at preset timings (e.g. 90° and 270° or thereabout in terms of a crank angle), i.e., at the time of the occurrence of a reaction force of rolling is assisted by the output of the hydraulic cylinder 11. Therefore, in such a case, it is possible to make a main drive system (such as the main motor 1, a reduction gear, a flywheel, a clutch, the crankshaft 2, the crankarm 3, and the connecting rod 5) compact and light in weight. For example, when a horizontal force necessary at a peak of a rolling reaction force is 30 tons, it is possible to impart an assisting force of about 10 tons to the hydraulic cylinder 11.

Figure 3A:
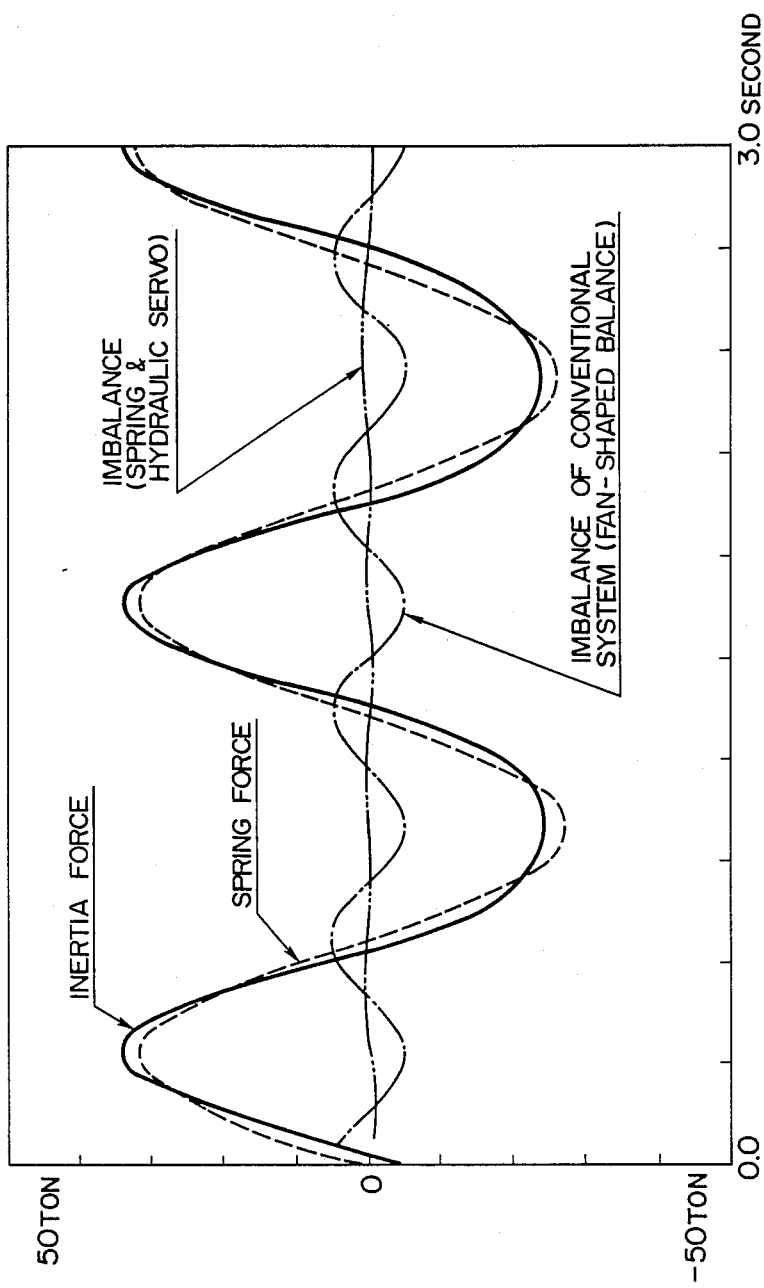
FIG. 3a is a graph illustrating imbalance created in a Pilger rolling mill.
Figure 3B:
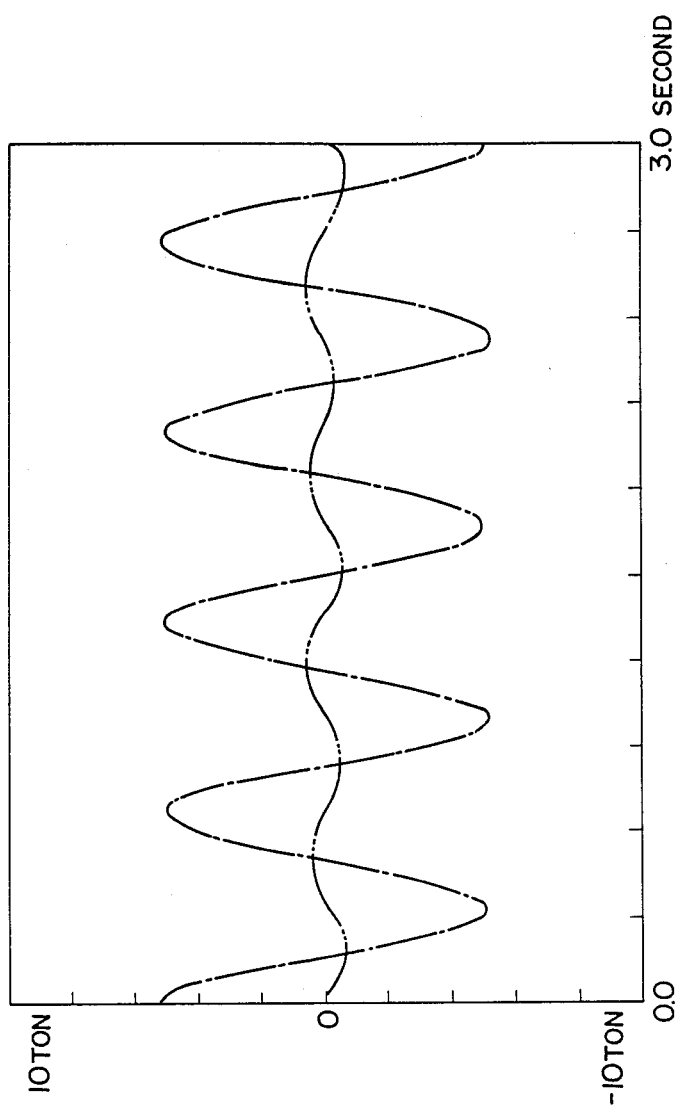
FIG. 3b is a graph illustrating only the amount of imbalance as shown in FIG. 3a in an enlarged form.

According to this embodiment, by virtue of the above-described control, the inertia force of the reciprocating motion of the Pilger mill stand 8 can be favorably balanced with the coil spring assembly 10. This state is shown in FIGS. 3a and 3b. In this example of testing, the conditions were set as follows: L=4,000 mm, R=720 mm, M=35 tons, the diameter of the hydraulic cylinder 11=720 mm/$\phi$90 × two sets (both sides), k of the coil spring assembly 10 =400 kg/cm ×2 sets (both sides), and $\omega$max=45 rpm. The drawing illustrates a state of imbalance of the inertia force. In other words, FIGS. 3a and 3b are graphs in which a force (ton) is taken as ordinates and time (second) as abscissas. FIGS. 3a is an overall diagram, while FIG. 3b is an enlarged view of only the imbalance shown in FIG. 3a. The solid line indicates an inertia force; the broken line, a spring force; the alternate long and short dash line, the imbalance of the conventional example shown in FIG. 2; and the alternate long and two short dashes line, the imbalance of this embodiment. As is apparent from the drawings, in the conventional example, 5 tons of the imbalanced force remains, but, in this embodiment, the imbalanced force can be eliminated down to 0.5 ton or less. Incidentally, since the Pilger mill stand 8 is supported at two points on both sides as viewed in the reciprocating direction, FIGS. 3a, 3b indicate a force acting on one point. Also, the inertia couple around the crankshaft 2 can be eliminated to 10%, or below in comparison with the conventional example.

Figure 4:
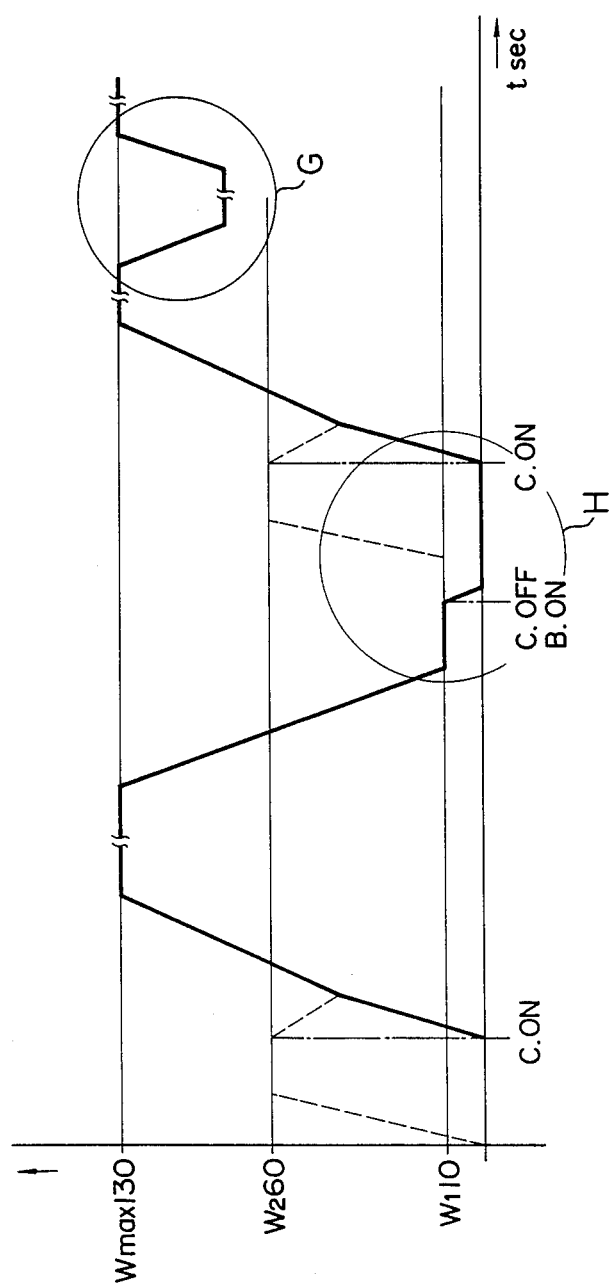
FIG. 4 is a diagram of operating modes.

Next, the Pilger rolling mill according to this embodiment can be run favorably by changing the rotational speed $\omega$ of the crankshaft 2. An example of operation in such a state is shown in FIG. 4. In this diagram of the operating modes, a multiplicity of pipes being worked are arranged linearly, as shown in the zone G, by operating a speed-changing gear or a clutch (neither are shown in FIG. 1) provided between the main motor 1 and the crankshaft 2. When effecting continuous rolling, $\omega$ is reduced from its maximum value to approximately half of it at the leading and following ends of respective pipes being worked, so as to prevent these portions from being cracked. In this case, when $\omega$ is reduced in operation, since, in this embodiment, a spring constant k corresponding to the lowered $\omega$ is made small by the spring constant varying device 16, the stroke of the hydraulic cylinder 11 can also be small. For example, although, in this embodiment, the stroke of the hydraulic cylinder 11 is set to about 10% of the magnitude of the stroke of the Pilger mill stand 8, if k is not varied, and $\omega$ is made small, the stroke of the hydraulic cylinder 11 becomes approximately half of the stroke of the Pilger mill stand 8. If k is varied and $\omega$ is made small, the stroke of the hydraulic cylinder 11 can be about 10% of the stroke of the Pilger mill stand 8.

Incidentally, although, in this embodiment, description has been made using the spring constant varying device 16, an arrangement may alternatively be provided such that, without altering the spring constant of the coil spring assembly 10, the spring force per se of the coil spring assembly 10 acting on the Pilger mill stand 8 is altered according to the rotational speed $\omega$ of the crankshaft 2. For instance, an arrangement may be provided such that the Pilger mill stand 8 is connected to one end of a lever supported at a center thereof, while a coil spring assembly is connected to the other end thereof, and the lever ratio is altered in accordance with the rotational speed ω, thereby altering the spring force. In addition, the mechanism for converting rotational motion into reciprocating motion should not be confined to a crank mechanism, and a cam-shaped mechanism may alternatively be used. Furthermore, although this embodiment has been described of a so-called large-type Pilger rolling mill (cold reducing tube mill), this invention should not be restricted to the same, and may be applied to a Pilger rolling mill for producing such as steel plates and bar steel.

In summary, the present invention provides the following advantages:

(1) In comparison with a conventional Pilger rolling machine having a V-balancer and a fan-shaped balancer, since the V-balancer and the like can be eliminated, it is possible to make the size of the overall apparatus compact, enable high-speed operation, facilitate maintenance, and simplify the foundation work. In addition, since the reciprocating motion can be balanced by means of the springs, it is possible to effect balancing with practically no need to effect compensation, and no excessively large external energy is required for balancing.

(2) Even if the rotational speed for reciprocating the Pilger mill stand is altered to give an optimum speed to the workpiece and the operating ratio is improved, since the spring constant is variable, and the position of the other end of the spring assembly can also be varied, a favorably balance can be attained.

(3) Since the spring constant is made variable, the stroke for adjusting the position of the other end (the fixed position) of the spring assembly can be shortened.

(4) Since the term of higher degree is balanced, it is unnecessary for the connecting rod, the crankarm, and the crankshaft for which high-quality material requiring machining is used to be subjected to an excessively large force, and it is, hence, possible to make these components compact. Accordingly, a remarkable reduction in costs can be accomplished. In addition, although in the case of a conventional example in which the foundation bolts (which are necessary for any Pilger mill stand) of a housing accommodating the Pilger mill stand eliminates only the term of first degree, it has been necessary for the inertia force of second degree to be at least supported. Therefore, if an attempt is made to effect high-speed operation, the foundation bolts need to be strengthened. According to this invention, however, the term of second degree is balanced, and only the horizontal reaction force (10% of a rolling force) of rolling needs to be supported. Hence, since such a horizontal reaction force is irrelevant to the rotational speed, even if an attempt is made to effect high-speed operation, no adverse effect is exerted to the foundation bolts, and they can be used as they are during low rotational speed. In other words, according to the present invention, even if the inertia force of the Pilger mill stand becomes large owing to the high-speed operation, the inertia force thereof cam be supported by a machine frame, for which machining is not required, via spring assembly, exerting no adverse effect on the foundation bolts.

While the invention has been described with respect to the Pilger rolling mill as a preferred embodiment, it will be understood that the invention is applicable to various machines having reciprocating heavy object and various change and modifications may be made therein without departing from the spirit and scope of the invention as set forth in the appended claims.

What is claimed is:

1. An inertia force balancing apparatus for a machine having a heavy object supported for horizontal reciprocating movement and a drive device for imparting reciprocating movement to said heavy object by converting rotational motion provided by a prime mover into reciprocating motion, said apparatus comprising:

spring means comprising a plurality of coil springs arranged in parallel and supported on a common member, said spring means including means for setting each of said coil springs in an operative condition, means connecting said common support to said heavy object to enable said spring means to balance the inertia force of the reciprocating movement of said heavy object, means for detecting the rotational speed of said drive device and for emitting a signal indicative of said rotational speed, a control device for controlling said means for setting each of said coil springs in an operative condition in response to said signal indicative of said rotational speed, and means for altering the position of said spring means relative to said heavy object including a hydraulic cylinder and a piston connected to said spring means and a servo valve responsive to said rotational speed of said drive device for supplying fluid pressure to said hydraulic cylinder to position said spring means relative to said heavy object, whereby said control device is operative to change the combination of said coil springs set in operation and thereby alter the spring constant of said spring means in response to the rotational speed of said drive device and said means for altering the position of said spring means is operative to control the position of said spring means relative to said heavy object in response to the rotational speed of said drive device.

2. An inertia force balancing apparatus according to claim 1, wherein said spring means is constituted by an elongated guide frame; a guide member longitudinally slidably supported in said guide frame; a plurality of spring rods extending longitudinally and penetrating said guide member and having spring bearings at opposite ends thereof; a plurality of coil springs each inserted over each of said spring rods on both sides of said guide member and each acting between said guide member and said spring bearing; a pair of hydraulic cylinders which are disposed at both end portions of said guide frame such as to face each other in alignment with each of said spring rods, and adapted to engage or disengage with the opposite ends of each of said spring rods so as to fix or release each of said rods relative to said guide frame; and a connecting rod extending longitudinally of said guide frame, having one end thereof connected to said heavy object and the other end thereof connected to said guide member.

3. An inertia force balancing apparatus according to claim 2 or claim 1 wherein said heavy object comprises a pair of Pilger mill rolls in a mill stand of a Pilger rolling mill.

* * * * *